May 26, 1936.  C. C. HALKYARD  2,042,395
CENTRIFUGAL MOLDING AND LINING OF PIPES AND THE LIKE
Filed May 26, 1934
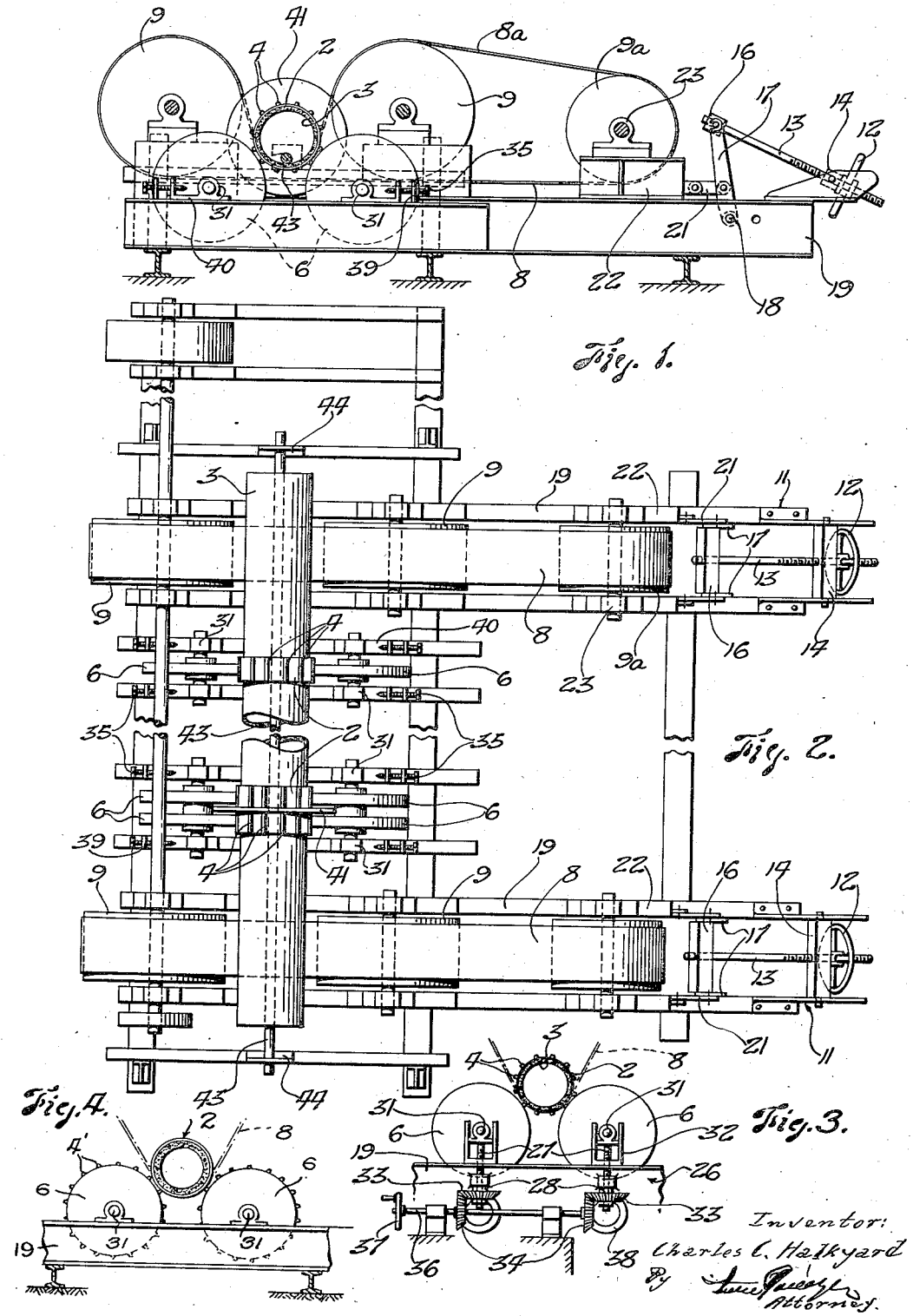
Inventor:
Charles C. Halkyard Patented May 26, 1936

2,042,395

UNITED STATES PATENT OFFICE 2,042,395

CENTRIFUGAL MOLDING AND LINING OF PIPES AND THE LIKE

Charles Cyril Halkyard, Melbourne, Victoria, Australia, assignor to Hume Pipe Company (Australia) Limited, Melbourne, Australia Application May 26, 1934, Serial No. 727,818
In Australia April 16, 1934

15 Claims. (Cl. 25—30)

In United States Patent No. 1,837,324 there is described a method and apparatus for centrifugally molding or lining pipes and the like with concrete or similar cementitious material by supporting and driving the mold or pipe to be lined upon endless flexible supporting and driving belts or bands so that each pipe or mold rests upon the upper stretches of said endless bands and is driven by frictional contact therewith.

According to United States Patent No. 2,023,381, it has been found that highly satisfactory results in the molding and lining of pipes with concrete may be obtained by subjecting a suitable concrete mixture within a pipe or like mold, simultaneously to centrifugal force and to a pronounced jolting or concussional action whereby the mold containing the said mixture is intermittently and abruptly projected upwardly from its normal position of rotation and returns forcibly thereto during such rotation. A feature of this method is that the concrete material is used in a semi-dry or non-liquid state having a minimum water content, the distribution of the moisture and consolidation of the concrete being effected mainly by the combined centrifugal and jolting actions with the result that a remarkably strong and dense concrete product is obtained.

The said Patent No. 2,023,381, describes an apparatus wherein one or more pipes or molds normally rest upon and are rotated by frictional contact with solid supports in the form of frictional supporting and driving wheels, the jolting or concussional action being imparted to the pipes or molds when desired by means of jolting wheels which are provided with circumferentially spaced projections thereon and may be rendered operative and inoperative at will.

The present invention aims primarily at the provision of means whereby the said combined centrifugal and pronounced jolting action may be imparted in a simple and effective manner to a pipe or mold which normally rests upon and is driven by frictional contact with the upper stretches of endless flexible supporting and driving bands as described in the aforesaid United States Patent No. 1,837,324 wherein the pipe is accommodated by sags or depressions in the upper stretches of said bands.

With the foregoing object in view, this invention provides an arrangement of jolting wheels or rings having circumferentially spaced projections adapted for fitting around the pipe or mold. In conjunction with these jolting wheels, the invention includes co-operating supplementary supports, such as friction wheels and means whereby said jolting wheels and friction wheels may be brought into peripheral engagement with each other so that the rotating pipe or mold is subjected to the said centrifugal and jolting action when so desired and the jolting wheels and friction wheels may be disengaged from each other when the pipe or mold is to be rotated or spun without the jolting or concussional action.

Referring to the drawing which forms part of this specification—

Figure 1 is a sectional elevation of apparatus for molding or lining pipes and the like in accordance with one embodiment of the present invention.

Figure 2 is a contracted plan view of the parts seen in Figure 1.

Figure 3 is a diagrammatic end view of portion of the apparatus in accordance with a modification, showing means for adjusting the height of the friction wheels in relation to the jolting rings on the pipe or mold.

Figure 4 is a fragmentary end view of apparatus in accordance with a modified form of the invention.

According to one suitable practical embodiment of the invention as illustrated in Figures 1 and 2 of the drawing, the jolting wheels or rings 2 may be adapted for detachable fitting around the pipe or mold 3 and may be provided with circumferentially spaced slats or projections 4 by which the jolting or concussional action is imparted to the mold as hereinafter described.

Mounted beneath each of the said bumping wheels or rings 2 is a supplementary support, such as a pair of idle friction wheels 6. The peripheries of these friction wheels are adapted to engage the said slats or projections 4 on the jolting wheels when so desired. Said friction wheels are preferably arranged in a plane lower than and out of lateral alignment with pulleys over which the endless supporting and driving bands pass as hereinafter described.

In order to effect such engagement of the slats or projections 4 with the friction wheels 6, the aforesaid endless belts or bands 8 may be arranged to pass over suitably disposed adjustable pulleys 9 so that, by adjustment of these pulleys, the upper stretches 8a of the endless bands supporting the pipe or mold 3 may be lowered or raised whereby the jolting wheels may be rested upon or lifted from said friction wheels at will. As seen in Figures 1 and 2 of the drawing, the means for adjusting each endless band 8 may comprise a hand operated screw device 11 which is operatively connected to one of the supporting pulleys 9 of each band, and preferably a pulley 9a adjacent to one end of the machine. Each said screw device may include a hand wheel 12 mounted upon a screwed rod 13 which passes through a support 14 and is secured at its opposite end to a cross bar 16. The latter may be connected to upstanding lever arms 17 which are pivotally supported as at 18 upon the machine frame 19 and connected by links 21 to a slidable support 22 for the bearings 23 of the respective pulley 9a.

Thus rotation of the hand wheels 12 effects longitudinal movement of the rods 13 in either direction, which movement is adapted to adjust the endless bands passing around the pulleys 9a through the medium of the aforesaid co-operating links and levers.

The pipe or mold 3 may be thus initially supported and rotated during charging of the mold with concrete whilst resting upon the endless bands 8 which may be then adjusted so that the jolting wheels 2 are lowered onto the friction wheels 6 and by further operation of the endless bands the pipe or mold may be rotated and at the same time violently jolted by the intermittent contact of the slats or projections 4 with the associated friction wheels. By again adjusting the endless bands 8, the pipe or mold 3 may be raised so that the jolting wheels 2 are disengaged from the friction wheels 6 whereupon the centrifugal process may be continued at a higher speed without the jolting action to complete the molding or lining process.

According to a modification as illustrated in Figure 3 of the drawing, instead of providing for the adjustment of the endless supporting and driving bands 8 to raise and lower the pipe or mold 3 in relation to the friction wheels 6 as aforesaid, the friction wheels may be provided with screw and nut or other suitable adjusting gear 26 whereby they may be moved into and out of engagement with the jolting wheels 2 around the pipe or mold. The screw and nut adjusting gear 26 for each pair of friction wheels may include pairs of threaded rods 27 located at opposite sides of the wheel and a rotatable nut 28 engaging each said rod. The latter carry the bearings 31 for their respective friction wheels whilst guides 32 may be provided for supporting the bearings during their vertical adjustment.

Each nut 28 may be provided with a bevel wheel 33 meshing with a co-operating bevel wheel 34 on a shaft 36 having a hand wheel 37. The shaft 36 may be conveniently located at one side of the machine and operatively connected by gearing 38 with the threaded rods 27 carrying the bearings 31 at the opposite side of the machine.

Thus, by operating the hand wheel 37, the bearings 31 for the pairs of friction wheels may be simultaneously adjusted vertically in accordance with requirements.

According to a further modification, the screw means for adjusting the friction wheels 6 so that they may be moved into and out of engagement with the jolting wheels 2 comprises a plurality of bolts 35, one for each bearing 31 of the respective friction wheels. These bolts extend transversely of the axes of the friction wheels and each said bolt passes through a screw hole in a stationary lug 39 upstanding from the machine frame and also through a coaligned threaded hole in a flange 40 carried by the associated bearing 31. In this instance, the bearings 31 are slidably mounted upon the machine frame so that, by screwing the respective bolts 35, the friction wheels of each pair may be moved towards or away from each other.

By this arrangement, the friction wheels 6 may be readily moved into and out of engagement with the jolting wheels 2 whilst the friction wheels may also be quickly and easily adjusted to accommodate pipes or molds of various diameters.

In order to prevent undue longitudinal movement of the pipe or mold 3 in relation to the friction wheels 6, a circumferential flange 41 may be formed upon or fitted to one or more of the jolting wheels or rings 2, said flange being adapted to engage the side faces or edges of the friction wheels 6 so as to limit such longitudinal movement as aforesaid.

Instead of fitting jolting rings 2 to the pipe or mold 3 as aforesaid, the friction wheels 6 may, in accordance with a further modification illustrated in Fig. 4, be provided with a series of circumferentially spaced slats or projections 4', which slats may contact direct with the pipe or mold. The necessity for fitting jolting rings 2 to each pipe or mold and subsequently removing the rings therefrom is thus eliminated.

In order to assist in spreading the semi-dry and non-flowing cementitious or other material after it has been fed into the pipe or mold, a bar or rod known as a "screed" bar 43 may extend longitudinally through the pipe or mold and be supported at its opposite ends by suitable brackets 44. The bar 43 is spaced inwardly from the inner surface of the pipe or mold for a distance approximately equal to the thickness of the wall of the pipe or lining. The screed bar 40 is described and claimed in my copending application Serial No. 727,817, filed May 26, 1934.

Having now described my invention what I claim as new and desire to secure by Letters Patent is—

1. In apparatus for the centrifugal molding and lining of pipes and the like, the combination of endless supporting and driving bands adapted to support and rotate the pipe or mold during part of the molding or lining process, supplementary supports adapted to take the weight of the pipe or mold from said endless bands during another stage of said process and means for imparting a pronounced jolting or concussional motion to the pipe or mold whilst it is carried upon said supplementary supports and is rotated by said endless bands.

2. In apparatus for the centrifugal molding and lining of pipes and the like, the combination of pulleys, endless supporting and driving bands carried by said pulleys and adapted to support and rotate the pipe or mold during part of the molding or lining process, friction wheels adapted to support the pipe or mold during another stage of said process and means for imparting a jolting or concussional motion to the pipe or mold whilst it is supported by said friction wheels and is rotated by said endless bands.

3. In apparatus for the centrifugal molding and lining of pipes and the like, the combination of endless supporting and driving bands adapted to support and rotate the pipe or mold during part of the molding or lining process, jolting wheels or rings having circumferentially spaced projections adapted for fitting around the pipe or mold, friction wheels, and means whereby said friction wheels and jolting wheels may be brought into peripheral engagement with each other, so that the rotating pipe or mold may be subjected to violent concussion during a stage of the molding or lining process, and said friction wheels and jolting wheels may be disengaged from each other when the pipe is to be rotated without such concussion.

4. Apparatus according to claim 1; characterized by jolting wheels or rings having circumferentially spaced slats or projections, said wheels or rings being adapted to detachably fit around the pipe or mold.

5. In apparatus for the centrifugal molding and lining of pipes and the like, the combination of endless supporting and driving bands adapted to support and rotate the pipe or mold during part of the molding or lining process, supplementary supports adapted to take the weight of the pipe or mold from said endless bands during another stage of said process and means for imparting a pronounced jolting or concussional motion to the pipe or mold whilst it is being carried upon said supplementary supports and is rotated by said endless bands, said supplementary supports comprising pairs of idle friction wheels which are located beneath the pipe or mold at positions clear of said endless bands, and means for adjusting the pipe or mold vertically in relation to said friction wheels.

6. Apparatus according to claim 1; characterized by jolting wheels or rings having circumferentially spaced slats or projections, said wheels or rings being adapted to detachably fit around the pipe or mold, said supplementary supports consisting of pairs of idle friction wheels which are located beneath the pipe or mold at positions clear of said endless bands, a pair of said idle friction wheels being located beneath each of the said jolting wheels or rings around the pipe or mold, and means for adjusting the relative position of the pipe or mold and said friction wheels.

7. Apparatus according to claim 1, wherein means are provided for adjusting said endless supporting and driving bands so that the pipe or mold carried thereby may be lowered onto and raised from said supplementary supports or friction wheels.

8. Apparatus according to claim 2, wherein said friction wheels are arranged in a plane lower than and out of lateral alignment with the pulleys over which the said endless bands pass, certain of said pulleys being adjustable so that the upper stretches of said endless bands supporting the pipe or mold may be lowered or raised in relation to said friction wheels.

9. Apparatus for the centrifugal molding and lining of pipes and the like comprising in combination endless supporting and driving bands arranged to pass over pulleys whereby a pipe or mold may rest within sags or depressions formed by the weight of the pipe or mold on the upper stretches of said endless bands, idle friction wheels arranged sidewardly of said endless bands, circumferentially spaced projections carried by said pipe or mold in the lateral plane of said friction wheels, said projections being adapted to impart a jolting or concussional motion to the pipe or mold during a stage of the molding or lining process, and adjusting means whereby said projections may be rendered operative or inoperative at will.

10. Apparatus according to claim 5, wherein said means for adjusting the pipe or mold vertically in relation to the friction wheels comprises one or more screw devices which is or are operatively connected to one of the pulleys of each endless band whereby actuation of the screw devices is adapted to move the associated pulleys towards or away from their companion pulleys.

11. Apparatus according to claim 5, wherein said means for adjusting the pipe or mold vertically in relation to the friction wheels comprises one or more screw devices, each said screw device including a threaded rod, a rotatable nut which engages said rod and is carried by a support on a stationary part of the machine frame, one or more lever arms pivoted to the machine frame and connected to said rod, and a slidable support carrying each said movable pulley and being operatively connected to said lever arms whereby actuation of said screw devices is adapted to move the associated pulleys towards or away from their companion pulleys.

12. In apparatus for the centrifugal molding and lining of pipes and the like, the combination of endless supporting and driving bands adapted to support and rotate the pipe or mold during part of the molding or lining process, supplementary supports adapted to take the weight of the pipe or mold from said endless bands during another stage of said process and means for imparting a pronounced jolting or concussional motion to the pipe or mold while it is being carried upon said supplementary supports and is rotated by said endless bands, said supplementary supports comprising pairs of idle friction wheels which are located beneath the pipe or mold at positions clear of said endless bands, and means for adjusting said friction wheels in relation to the pipe or mold.

13. Apparatus according to claim 12, wherein said means for adjusting the friction wheels in relation to the pipe or mold consists of screw and nut adjusting gear which includes threaded rods carrying the bearings for said friction wheels, rotatable nuts engaging said rods and gearing associated with said nuts whereby the bearings for the respective friction wheels of each pair may be simultaneously adjusted vertically in accordance with requirements.

14. Apparatus according to claim 12, wherein said means for adjusting the friction wheels in relation to the pipe or mold are adapted to move the friction wheels of each pair towards or away from each other.

15. Apparatus according to claim 5, wherein said means for adjusting the friction wheels in relation to the pipe or mold consists of a plurality of bolts, one for each bearing of the respective friction wheels, each said bolt extending transversely of the axes of the friction wheels and passing through so-aligned threaded holes in a stationary lug on the machine frame and a part of the associated bearing, said bearings being slidably mounted upon the machine frame so that adjustment of said bolts moves the friction wheels of each pair towards or away from each other.

C. C. HALKYARD.